Feb. 12, 1952     H. J. P. SKINNER     2,585,281
SCAFFOLDING

Filed April 15, 1946     2 SHEETS—SHEET 1

INVENTOR:
HENRY JOHN PROWSE SKINNER
BY:
ATTORNEY

Feb. 12, 1952 — H. J. P. SKINNER — 2,585,281
SCAFFOLDING
Filed April 15, 1946 — 2 SHEETS—SHEET 2

INVENTOR:
HENRY JOHN PROWSE SKINNER
BY:
ATTORNEY

Patented Feb. 12, 1952

2,585,281

UNITED STATES PATENT OFFICE 2,585,281

SCAFFOLDING

Henry John Prowse Skinner, London, England, assignor to International Constructions Corporation Limited, Nassau, Bahamas Application April 15, 1946, Serial No. 662,235
In Great Britain February 26, 1945

Section 1, Public Law 690, August 8, 1946
Patent expires February 26, 1965

5 Claims. (Cl. 287—54)

This invention relates to scaffolding and has for its object to provide an improved form of device for connecting together ledgers and standards, which is free of bolts or nuts, easy of assembly, tightens under load and gives a visible indication when loose.

According to the present invention a device for connecting a ledger to a standard consists of a U-shaped member of sheet metal which is capable of fitting closely around the standard, the limbs of the U-shaped member being provided at their edges with wedge-shaped slots for receiving the ledger, one edge of each slot being within the area to be occupied by the standard.

One of the limbs of the U-shaped member may be provided with a screw-threaded hole engaged by a screw, the hole being so positioned that the screw can be tightened against the portion of the standard against which the ledger is to bear.

The ledger, when engaging the wedge-shaped slots, is preferably adapted to be drawn into the wedge-shaped slots by a forked member of which the ends of the prongs are each provided with a hook for engagement with the ledger, on the portions thereof outside the U-shaped member, whilst the connecting portion at the ends of the prongs is adapted to engage the cam surfaces formed by the lower edges of the U-shaped member.

The forked member may be provided with an extension to facilitate the forked member being engaged with the cam surfaces or disengaged therefrom.

The invention will now be described by way of example with reference to the accompanying drawings, wherein—

Figure 1:
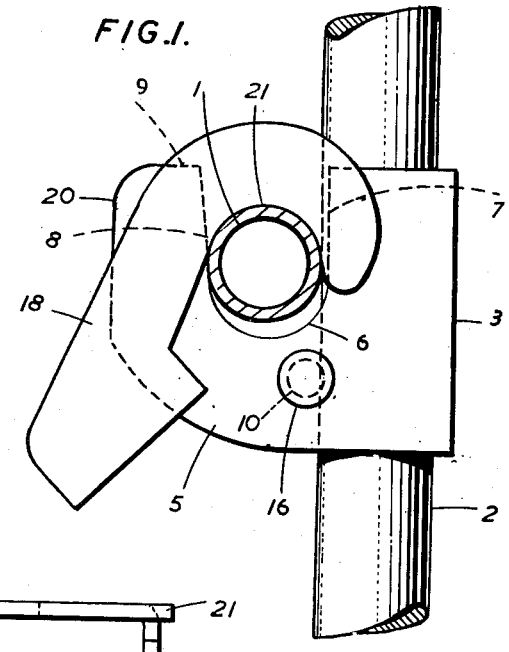
Figure 1 shows a side view of a device connecting a ledger to a standard.
Figure 6:
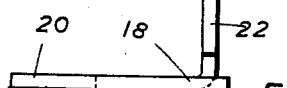
Figures 4, 5 and 6 show respectively a side view, a front elevation, and a plan of a member for securing the ledger in position.

As shown in the drawings, a device for connecting a ledger 1 to a standard 2 in scaffolding consists of a U-shaped member 3 of sheet metal, which fits closely around the standard 2 and has its limbs 4 and 5 projecting beyond the standard 2.

In the upper edges of the limbs 4 and 5 of the U-shaped member 3 are provided wedge-shaped slots 6. The slots 6 are so positioned that one edge 7 thereof, which is preferably parallel to the axis of the standard 2, is located within the area of the standard 2, whilst the other edge 8 is inclined inwardly from the upper edge 9 of the U-shaped member 3 so that when the ledger 1 is placed in the slots 6 it is wedged between the edge 8 and the standard 2, the wedging action becoming the greater, the greater the load on the ledger 1.

Figure 7:
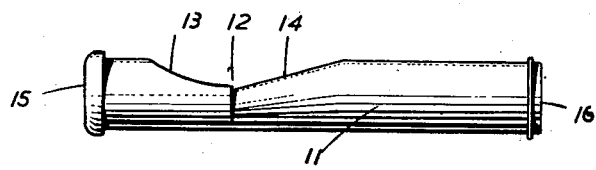
Figures 7 and 8 show a plan and side view of a rod for securing the U-shaped member to the standard.
Figure 8:
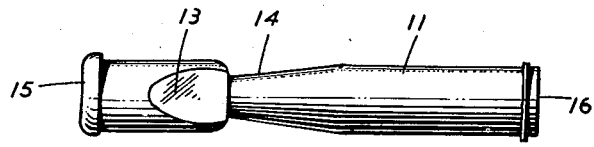

In order to position the U-shaped member 3 on the standard 2 during assembly, the limbs 4 and 5 are provided, below the wedge-shaped slot 6, with registering holes 10, with which engages a rod 11 which, as shown in Figures 7 and 8, is provided in one side with a cavity 12, of which a portion 13 may be flat, whilst a portion 14 is toothed. The rod 11 is provided at opposite ends with heads 15 and 16. The head 15 is capable of passing through the hole 10 in the limb 4, but not through the hole 10 in the limb 5, which latter is provided, around its hole, with a recess 17 for receiving the head 15 when the member 3 is being fitted to the standard 2. The hole 10 in the limb 5 is of such size as to prevent the heads 15 and 16 passing therethrough, so that the rod 11 cannot be detached from the member 3.

The U-shaped member 3 is applied to the standard 2 with the rod 11 drawn outwardly and the head 15 engaging with the recess 17. When the member 3 is in position on the standard 2 the rod 11 is pushed or driven across the standard 2 so as to bring the headed end 15 into engagement with the hole in the limb 4. Should the member 3 tend to slip downwardly on the standard 2 then, as a result of the engagement of the standard 2 in the cavity 12, and more particularly with the toothed portion 14, the rod 11 is turned whereby a cam or wedging action occurs between the rod 11 and the standard 2, thus effectively preventing any further downward slip of the member 3.

In order to hold the ledger 1 more effectively in the wedge-shaped slots 6, a forked sheet metal member 18 is provided of which the prongs 19 and 20 pass closely adjacent the outer sides of the limbs 4 and 5, whereby these are prevented from spreading, whilst the free ends of the prongs are hook-shaped, as indicated at 21, for engagement over the ledger 1.

Figure 2:
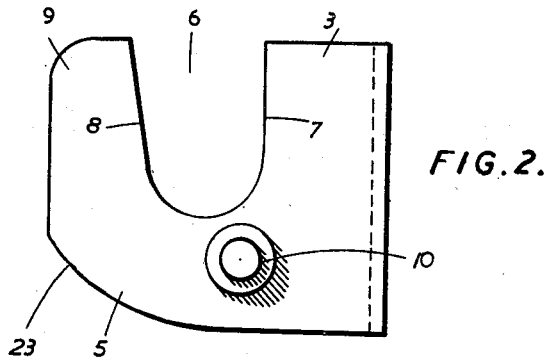
Figures 2 and 3 show respectively a side view and plan of a U-shaped member for engaging with the standard.
Figure 3:
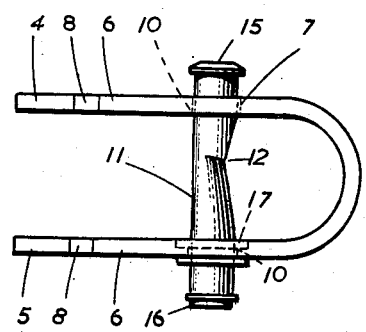
Figures 4, 5:
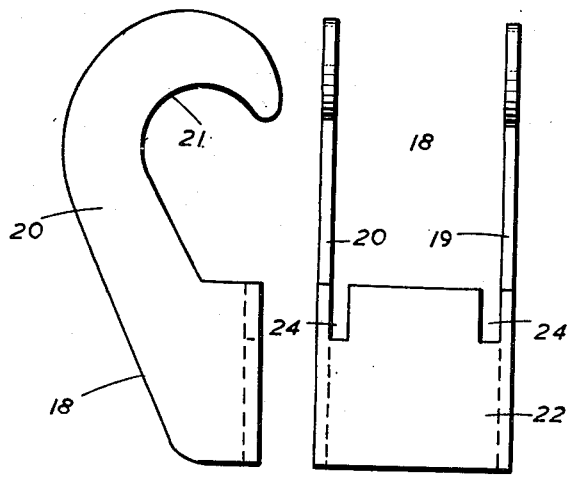

The connecting portion 22 between the prongs 19 and 20 is provided with slots 24 for engagement by the lower edges of the limbs 4 and 5, which are preferably cam-shaped, as indicated at 23 (Figure 2), so that the hooks 21 are forced against the ledger 1 and press this between the inclined edges 8 of the slots 6 and the standard 2.

The connecting piece 22 of the forked member 18, which extends downwardly, is adapted to be engaged by a suitably forked tool or struck with a hammer so as to enable the forked member 18 to be driven into its engaging position.

The U-shaped member 3 and the forked member 18 may be provided with suitably positioned holes or slots, whereby the two members may be locked together by a pin passing through registering holes or slots.

The cam surfaces or lower edges 23 of the limbs 4 and 5 may be provided with ratchet teeth for engagement by a projection or other means on the forked member 18 so as to lock the two members 3 and 18 relatively to one another.

As in the engaged position the forked member 18 extends substantially parallel to the standard 2, the forked member 18 when in an inclined position gives a visible indication that the member 18 is loose and requires attention.

It may be desirable that the forked member 18 be manufactured out of spring steel with the prongs 19 and 20 splayed outwardly so as to engage the ledger 1 at an appropriate distance on each side of the limbs 4, 5 of the U-shaped member 3, thus providing additional tolerance for take up on the cams 23 at the lower edges of the limbs 4, 5 of the U-shaped member 3. The U-shaped member 3 may also be made of spring metal if desired.

The rod 11 may be replaced by a screw passing through a screw-threaded hole in one of the limbs of the member 3 and engaging with the standard 2.

What I claim is:

1. A device for connecting a ledger to a standard, said device comprising a U-shaped member capable of fitting closely around said standard, said U-shaped member having a pair of upturned extremities each provided with an edge inclined toward the vertical, said inclined edges and said channel forming a wedge-shaped channel for said ledger which at the top is wider and at the bottom narrower than said ledger, thereby insuring the existence of a clearance between the bottom of said channel and said ledger when the latter is received by said channel, a forked member having a pair of limbs and a connecting portion therefor, and a pair of hooks located one at the free end of each of said limbs, said connecting portion being adapted to engage with the underside of said U-shaped member after the said hooks have been engaged with said ledger when the latter is received by said channel, thereby clamping said ledger between said hooks and said inclined edges.

2. A device according to claim 1 wherein said connecting portion is provided with a pair of recesses each mating with the lower edge of one of the extremities of said U-shaped member.

3. A device according to claim 1 wherein the extremities of said U-shaped member have cam-shaped lower edges engageable by said connecting portion.

4. A device according to claim 1 wherein said connecting portion is provided with an extension facilitating the operation of said forked member to place the same in engagement with and disengagement from said U-shaped member.

5. A device for connecting a ledger to a standard, said device comprising a U-shaped member capable of fitting closely around said standard, said U-shaped member having a pair of upturned extremities each provided with an edge inclined toward the vertical, said inclined edges and said standard forming an upwardly opening wedge-shaped channel for said ledger which at the top is wider and at the bottom is narrower than said ledger, thereby insuring the existence of a clearance between the bottom of said channel and said ledger when the latter is received by said channel, and a rod rotatably carried by said extremities provided with a cam portion and a toothed portion both in contact with said standard, displacement of said device relative to said standard causing said toothed portion to rotate said rod and to force said cam portion into tighter engagement with said standard.

HENRY JOHN PROWSE SKINNER.

REFERENCES CITED

The following references are of record in the file of this patent:

UNITED STATES PATENTS

| Number | Name | Date |
| --- | --- | --- |
| 766,345 | Hanson | Aug. 2, 1904 |
| 905,090 | McClure | Nov. 24, 1908 |
| 1,153,552 | Hunkin | Sept. 14, 1915 |
| 1,375,456 | Hasty | Apr. 19, 1921 |
| 1,434,352 | Jester | Oct. 31, 1922 |
| 1,569,136 | Pardee | Jan. 12, 1926 |
| 1,594,081 | Van Duzer | July 27, 1926 |
| 1,850,021 | Marrone | Mar. 15, 1932 |
| 1,920,130 | Pease et al. | July 25, 1933 |

FOREIGN PATENTS

| Number | Country | Date |
| --- | --- | --- |
| 13,799 | Great Britain | June 11, 1909 |
| 288,511 | Great Britain | Apr. 12, 1928 |
| 460,315 | Great Britain | Jan. 26, 1937 |